United States Patent
Roush (10) Patent No.: US 12,509,164 B2
(45) Date of Patent: *Dec. 30, 2025

(54) CONTAINER SIDEWALL AND ROOF CONNECTOR

(71) Applicant: Vanguard National Trailer Corporation, Monon, IN (US)

(72) Inventor: Mark Roush, Lafayette, IN (US)

(73) Assignee: Vanguard National Trailer Corporation, Monon, IN (US)

( * ) Notice: Subject to any disclaimer, the term of this patent is extended or adjusted under 35 U.S.C. 154(b) by 621 days.

This patent is subject to a terminal disclaimer.

(21) Appl. No.: 17/887,743

(22) Filed: Aug. 15, 2022

(65) Prior Publication Data

US 2022/0388579 A1 Dec. 8, 2022

Related U.S. Application Data (63) Continuation of application No. 17/160,667, filed on Jan. 28, 2021, now Pat. No. 11,414,139.

(51) Int. Cl.
*B62D 33/04* (2006.01)
*B65D 90/08* (2006.01)

(52) U.S. Cl.
CPC ........... *B62D 33/046* (2013.01); *B65D 90/08* (2013.01)

(58) Field of Classification Search
CPC .............................. B62D 33/046; B65D 90/08
See application file for complete search history.

(56) References Cited

U.S. PATENT DOCUMENTS

| | | | | |
|---|---|---|---|---|
| 3,192,377 | A | 6/1965 | Abolins | 362/485 |
| 3,196,267 | A | 7/1965 | Abolins | 362/548 |
| 4,065,168 | A * | 12/1977 | Gregg | B62D 33/04 |
| | | | | 296/29 |
| 4,098,037 | A | 7/1978 | Pratt | 52/23 |
| 4,375,899 | A | 3/1983 | Kajiyama | 296/213 |
| 5,000,507 | A | 3/1991 | Baxter | 296/104 |
| 5,143,416 | A * | 9/1992 | Karapetian | F16B 9/052 |
| | | | | 256/65.01 |
| 5,934,741 | A * | 8/1999 | Beukers | B60P 3/20 |
| | | | | 296/181.6 |
| 6,367,871 | B2 | 4/2002 | Grimm | 296/210 |
| 7,021,014 | B1 | 4/2006 | Wolfe | 52/270 |
| 8,025,331 | B2 | 9/2011 | Ehrlich | 296/185.1 |
| 8,177,289 | B2 | 5/2012 | Haire | 296/182.1 |
| 8,322,779 | B2 | 12/2012 | Kramer | 296/185.1 |
| 8,459,725 | B2 * | 6/2013 | Haire | B62D 33/04 |
| | | | | 296/182.1 |
| 10,479,419 | B2 | 11/2019 | Storz | B62D 33/04 |

(Continued)

*Primary Examiner* — Babajide A Demuren
(74) *Attorney, Agent, or Firm* — McAndrews, Held & Malloy, Ltd.

(57) ABSTRACT

Disclosed is a connector between sidewalls, or the top rails of the sidewalls, and roof panels. The connector includes a downwardly oriented pocket adapted to receive a portion of the sidewall and an inwardly oriented pocket adapted to receive a portion of a roof panel. The connector also includes a base flange that is comparatively sized to, and adapted to be supported by, a roof bow support ledge of the sidewall. The inwardly oriented pocket is located directly above, and offset from, the base flange of the connector. Connectors, such as adhesives or rivets, may be utilized to secure the connector to the sidewall and to secure the connector to the roof panel.

20 Claims, 12 Drawing Sheets

(56) References Cited

U.S. PATENT DOCUMENTS

| | | | |
|---|---|---|---|
| 10,596,950 B2 | 3/2020 | Bauer | B62D 29/04 |
| 2004/0026962 A1 | 2/2004 | Wieschermann | 296/193.12 |
| 2009/0159592 A1 | 6/2009 | Vitalis | 220/1.5 |
| 2011/0221232 A1 | 9/2011 | Haire | 296/185.1 |
| 2012/0217768 A1 | 8/2012 | Haire | 296/185.1 |

* cited by examiner

Fig. 1

PRIOR ART

Fig. 2

PRIOR ART

CONTAINER SIDEWALL AND ROOF CONNECTOR

CROSS-REFERENCE TO COPENDING APPLICATION

This application is a continuation of U.S. patent application Ser. No. 17/160,667 filed on Jan. 28, 2021 entitled "Container Sidewall and Roof Connector" that issued on Aug. 16, 2022 as U.S. Pat. No. 11,414,139, the contents of which are all herein incorporated by reference.

FIELD OF THE INVENTION

The present invention relates to a connector between a container sidewall and a container roof. The present invention may be employed in any container structure and is particularly suited for use in an over-the-road trailer.

BACKGROUND OF THE INVENTION

Figure 1:
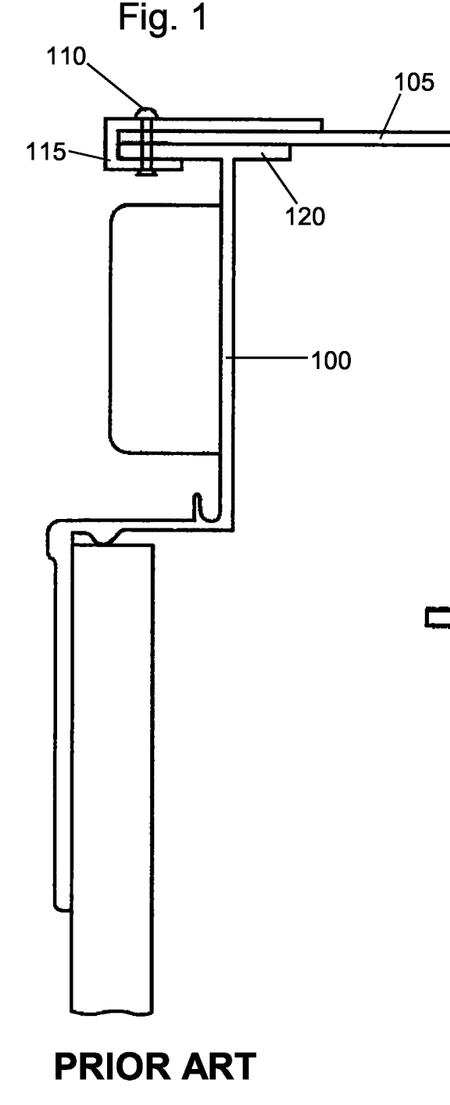
FIG. 1 shows FIG. 1C from U.S. Pat. No. 8,177,289 by Haire et al. that alleges to depict a cross-sectional view of "a conventional top rail assembly for a container body."

FIG. 1, from U.S. Pat. No. 8,177,289 by Haire, illustrates an example of a container sidewall/roof connection employing a traditional connection between a roof and sidewalls. In the illustrated example, a top rail 100 and roof 105 are of similar materials. Sidewalls and rooves for over-the-road trailers are commonly made from aluminum due to its strength, light weight, and corrosion resistance. By using materials of similar strengths and characteristics (expansion, electrode potentials, etc.) for the roof and sidewalls, the two structures may be joined simply by fastening the two structures directly together through adhesives and/or rivets. In the Haire reference, a rivet 110 and a "J"-shaped piece of metal 115 hold the roof 105 in place against the top lip 120 of the top rail 100.

Figure 2:
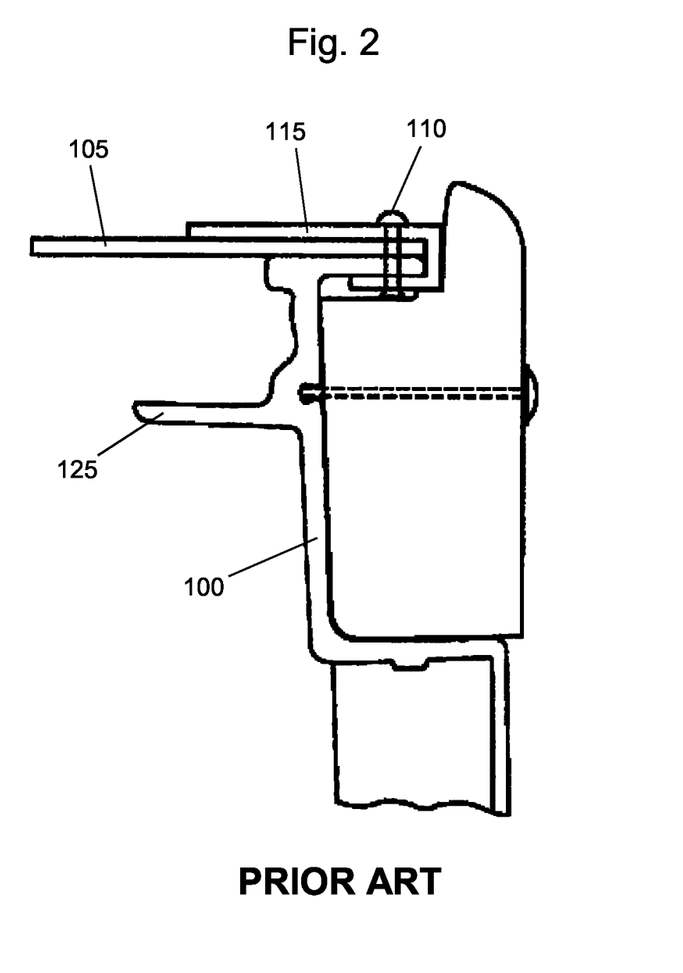
FIG. 2 shows FIG. 5D from U.S. Pat. No. 8,177,289 by Haire et al. that alleges to disclose a "cross-sectional view of exemplary top rail embodiments comprising exemplary support blocks."

FIG. 2, also from U.S. Pat. No. 8,177,289 by Haire, shows another example of a traditional roof sidewall connection. The connection shown in FIG. 2 includes a top rail 100 secured to a roof 105 via a rivet 110 and J-channel 115 (or J-shaped piece of metal). The example shown in FIG. 2 also includes a roof bow support ledge 125 adapted to receive support members, such as roof bow supports that are used to support the roof 105.

Additional examples of traditional connections between container roofs and sidewalls may be found in FIGS. 2 and 3 of U.S. Pat. No. 3,192,377 and FIG. 2 of U.S. Pat. No. 3,196,267, both by Abolins.

Although the Haire and Abolins connections are acceptable when similar materials are used for both the top rail/sidewall and the roof, when dissimilar materials are used for the roof and sidewall of a container, there exists a need for a specialized connection between the roof and sidewall of the container.

SUMMARY OF THE INVENTION

In accordance with the preferred embodiments of the present invention, some of the issues associated with sidewalls and container roofs of different construction materials are overcome. A connector of composite roofs and sidewalls is presented.

The improved container includes a sidewall having a vertically oriented panel extending from about the bottom of the container to about the top of the container. At about the top of the sidewall, a horizontal panel extends inward towards the storage area of the container. A vertical section extends upward from the innermost portion of the horizontal panel, and a first flange extends further inward from the middle portion of the vertical section. At the top of the vertical section, a second flange extends outwardly parallel to the first flange. The horizontal panel, vertical section, and second flange generally form a U-shape.

The composite connector has a central wall that generally abuts the vertical section of the top rail. At the bottom-most portion of the vertical section of the composite connector, a bottom flange extends inwardly that abuts a first flange of the top rail. A center flange extends inwardly from the central wall of the composite connector, wherein the center flange extends parallel to the first flange and is spaced a distance from the first flange. Above the second flange is an area of the central wall adapted to receive a composite roof panel. At the top of the central wall of the composite connector, a top plate extends perpendicular to the vertical section. The innermost portion top plate, the center flange, and an upper portion of the central wall section form a C-shape that is adapted to receive a composite roof panel. At the outermost section of the top plate is a downward flange that is adjacent to the outermost portion of the second flange of the sidewall. The downward flange of the top plate generally acts to prevent inward movement of the composite connector relative to the sidewall.

In one embodiment, the composite roof panel includes a top sheet that has an outermost portion adjacent to the innermost portion of the horizontal portion of the composite connector. The composite roof panel also has a bottom sheet with an outermost portion abutting the second flange of the vertical section of the composite connector. The top and bottom sheets are preferably aluminum or steel, although other metals may also be used to create the composite panels. Although composite panels are preferable due to their high strength-to-weight ratio, solid panels may also be used and would be within the scope of the present invention.

DETAILED DESCRIPTION

The present invention may be used in association with any container structure having a sidewall and a roof. However, for the purposes of this application, the invention will be primarily described in association with an over-the-road trailer.

Figure 3:
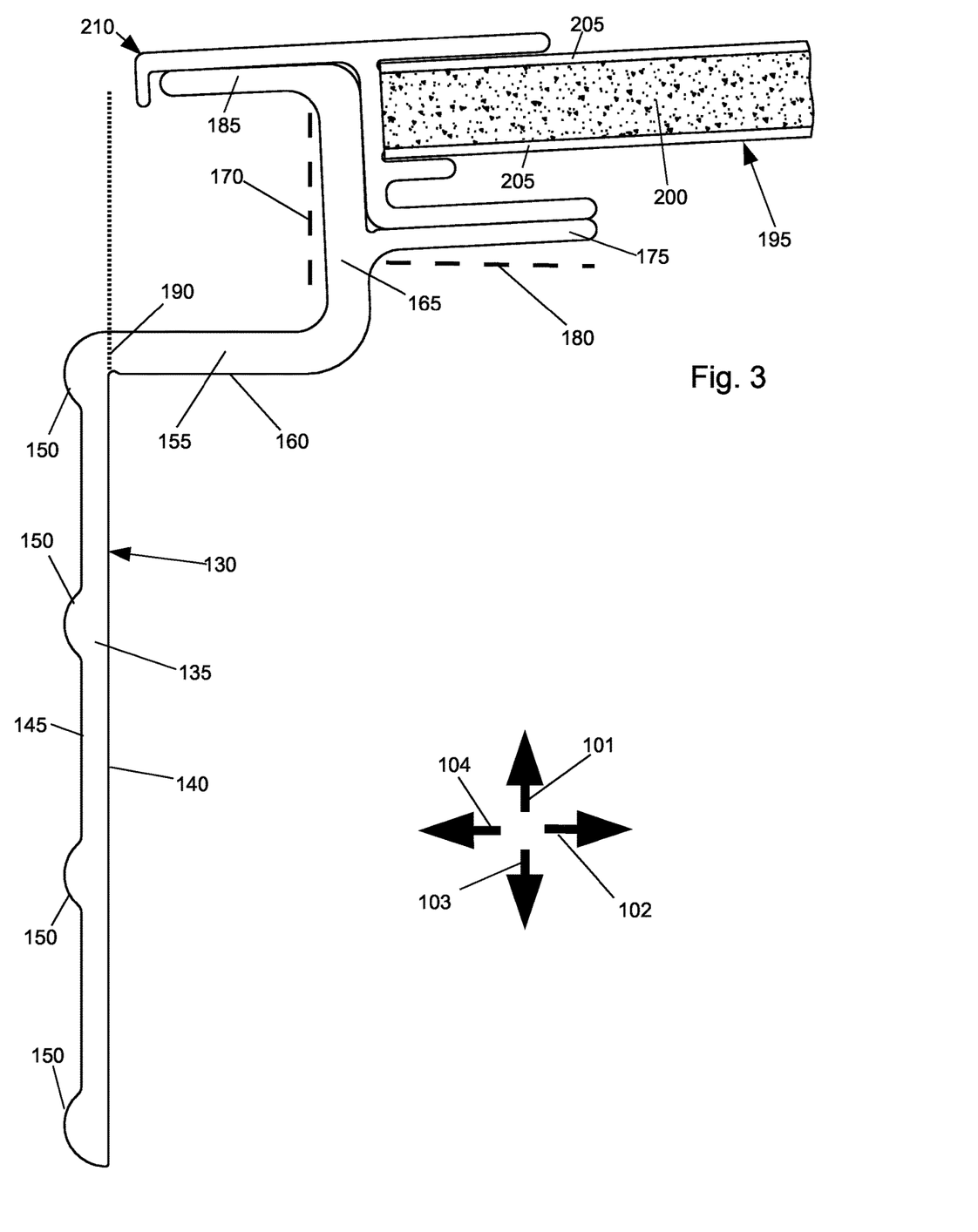
FIG. 3 shows a composite roof secured to a top rail via a connector.

FIG. 3 shows a top rail 130 of a container having a lowermost portion 135 with a smooth inner side 140 adapted to be secured adjacent to a side panel of a sidewall. The lowermost portion 135 includes an exterior side 145 having a plurality of scuff guards 150 adapted to protect the top rail 130. In the illustrated example, the scuff guards 150 are shown as round; however, other shapes may also be used. Above the lowermost portion 135, the top rail includes a horizontal top 155 with a flat inner side 160 adapted to be located above and adjacent to the side panels of the container. Extending up from the horizontal top 155 of the top rail 130 is a vertically oriented portion 165 that generally extends parallel to the lowermost portion 135 of the top rail. While the vertically oriented portion 165 generally extends upward parallel to the lower most portion 135, in the illustrated example, the vertically oriented portion 165 has a slight outward slant as shown by the vertical geometric line 170. By having a slight inward slant, the vertically oriented portion imparts a slight slant onto the roof of the container, which assists the container in shedding water. At the midsection of the vertically oriented portion 165, an inner flange 175 (or lower flange) extends inwardly at a generally horizontal orientation. In the illustrated example, the inner flange 175 does not extend perfectly horizontal and is angled slightly upward as it extends inward. The slant of the inner flange 175 is illustrated by its orientation relative to a horizontal geometric line 180. In the illustrated example, the slant is between two and three degrees above horizontal. At the top of the vertically oriented portion 165, an outer flange 185 (or top flange) extends outward parallel to the inner flange 175 (i.e., generally horizontal) to an area that is inward of the outermost part 190 of the horizontal top 155.

In the illustrated example, the first direction 101 is referred to as the upward direction, the second direction 102 is referred to as the inward direction, the third direction 103 is referred to as the downward direction, and the fourth direction 104 is referred to as the outward direction. These directions generally refer to the orientation of a structure relative to the center of a cargo container. The terms "downward" or "below" are herein defined to refer to the general direction toward the far end of the sidewall from the sidewall-roof connector. In the instance of a container with vertical sidewalls and a roof located above the sidewalls relative to the earth (i.e., standard orientation), the terms "downward" and "below" will have the same meaning as their plain and ordinary meanings. However, if the container tips over (or is upside down) so that the roof is not above the sidewall from a global perspective, the sidewall is still downward from the sidewall-roof connector as used herein.

The terms "upward" and "above" refer to the opposite direction as "downward" and "below." The term "vertically oriented" refers to the orientation of something extending "upward" or "downward." The term "inward" is defined refer to the general direction toward the far end of the roof panel from the sidewall-roof connector, and "outward" is defined to be the opposite direction as "inward." The term "horizontally oriented" refers to the orientation of something extending "inwardly" or "outwardly."

The roof panel 195 shown in FIG. 3 is a composite comprised of an inner core material 200 and outer skins 205 covering the inner core material 200. In one embodiment, the roof panels are made of a core plastic material and an outer skin of aluminum or steel. In an alternative embodiment, the inner core material is a foam, lattice material, a wood material, or a composite of multiple materials. The outer skins may be constructed of aluminum or steel, or they may be constructed of other resilient materials such as carbon fiber.

Figure 4:
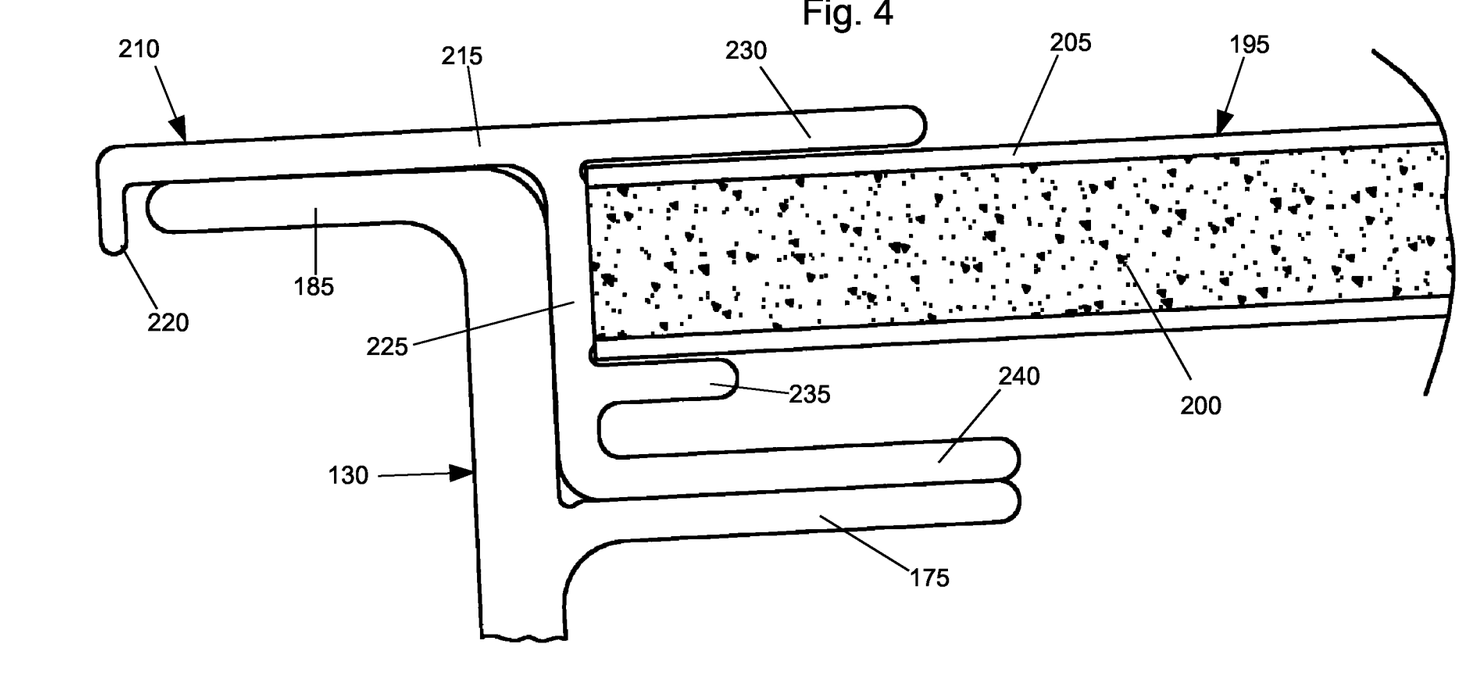
FIG. 4 shows a magnified view of the top rail-roof connecter of FIG. 3.

As highlighted in FIGS. 3 and 4, the sidewall-roof connector 210 shown in FIG. 3 has a flat top 215 that extends from slightly inward of the outermost part 190 of the horizontal top 155 to the roof panel 195. A downward protrusion 220 extends at the outermost portion of the flat top 215. The length of the downward protrusion in the illustrated embodiment is approximately that of the thickness of the outer flange 185 of the top rail 130. The downward protrusion 220 acts to at least partially secure the sidewall-roof connector 210 to the top rail 130 by preventing inward movement of the sidewall-roof connector 210 relative to the top rail 130. Extending downward from the flat top 215 (or top panel) is a central portion 225 (or central wall) that extends down to the inner flange 175 of the top rail 130. The central portion 225 extends perpendicularly from the flat top 215 and is spaced apart from the downward protrusion 220 by a distance that is slightly larger than the length of the outer flange 185 of the top rail 130.

The downward protrusion 220, the outward portion 231 of the flat top 215, and the central portion 225 form a downwardly opening pocket adapted to receive the outer flange 185 of the top rail. The spacing of the central portion 225 from the downward protrusion 220 is such that the outer flange 185 may easily be placed between the central portion 225 and the downward protrusion 220 while limiting inward and outward movement of the sidewall-roof connector 210 relative to the top rail 130. In one embodiment, the separation of the downward protrusion 220 and the central portion 225 is just $\frac{1}{20}^{th}$ of an inch more than the width of the outer flange 185 of the top rail 130.

The flat top 215 of the sidewall-roof connector 210 includes an inward portion 230 that is located adjacent to a portion of the upper outer skin 205 of the roof panel 195. Extending inward from the central portion 225 is a central flange 235 that is located adjacent to a portion of the lower outer skin 205 of the roof panel 195. The inward portion 230 and the central flange 235 inwardly extend parallel to each other and are separated from each other by approximately the width of the roof panel 195. The inward portion 230, the central flange 235, and an upper part of the central portion 225 together form an inwardly opening pocket that is dimensioned to receive and hold an end of the roof panel 195. In the illustrated example, the length of the central flange 235 is less than the length of the inward portion 230, but other embodiments of the invention may include central flanges that have an equal, or greater, length than the inward portion 230.

At the bottom of the central portion 225, a base flange 240 inwardly extends parallel and adjacent to the inner flange 175 of the top rail 130. In the illustrated example, the length of the base flange 240 is approximately equal to the length of the inner flange 175. The base flange 240 extends from the central portion 225 parallel to both the central flange 235 and the inward portion 230 of the top plate 215.

In an exemplary embodiment, the sidewall-roof connector is constructed from aluminum, but the connector may also be made from other materials such as fiber glass, carbon fiber, or stainless steel, or the connector may have a composite construction like the roof panel. In the illustrated examples, the sidewall-roof connector is shown as a single structure with a unitary construction. However, in alternate embodiments of the invention, the sidewall-connector may be constructed from multiple pieces. For example, in one embodiment, the flat top and central portion (or central wall) of the connector are separable pieces that are held together via fasteners. In yet another embodiment of the invention, the central flange is separable from the central portion and is secured via fasteners. The central portion includes apertures at a plurality of elevations for receiving the fasteners such that the pocket (formed by the central flange, inward portion, and upper part of the central portion) may be adjusted to receive roof panels of a plurality of thicknesses.

Figure 5:
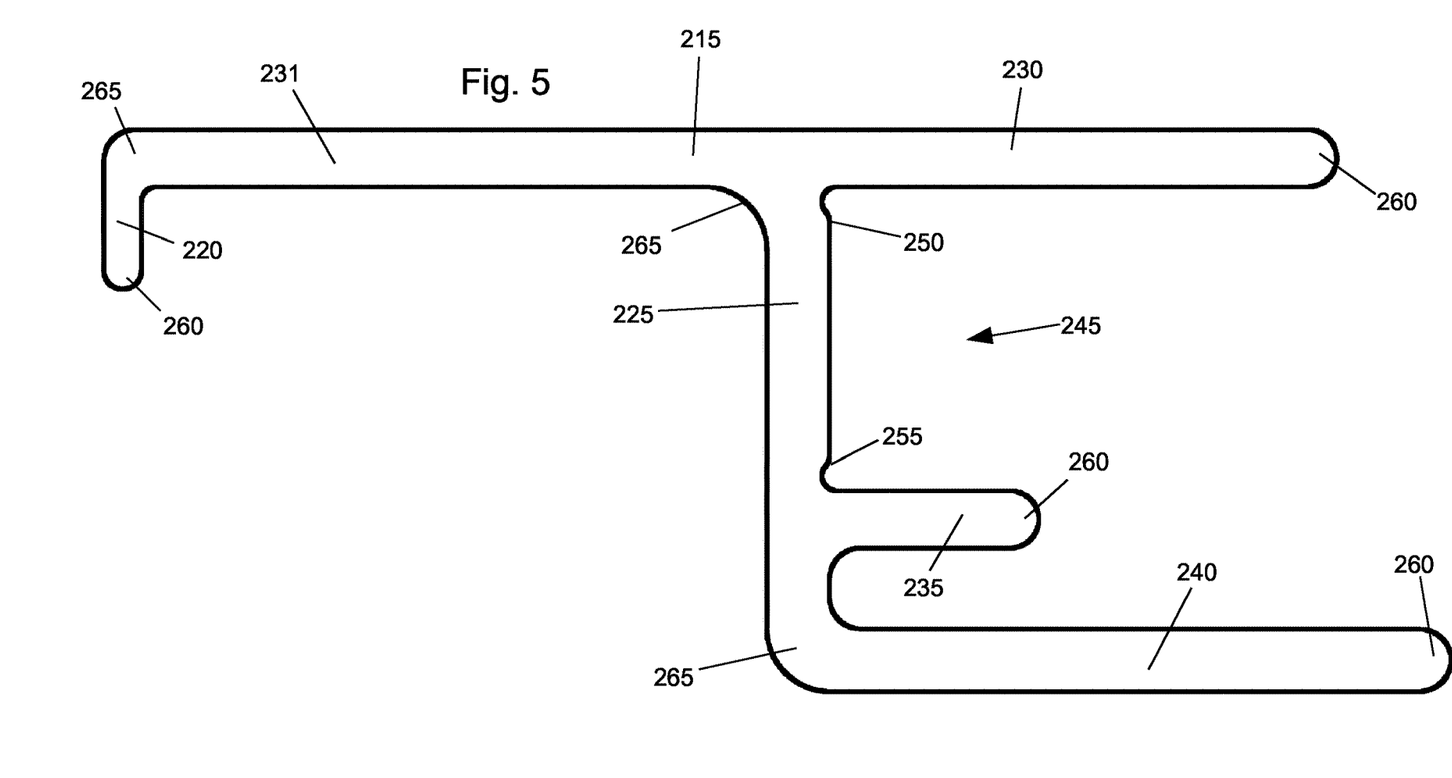
FIG. 5 shows an isolated view of the connector of FIG. 3.

FIG. 5 shows the sidewall-roof connector 210 in isolation. The inward portion 230 of the flat top 215, the upper part of the central portion 225, and the central flange 235 form a groove 245 (or inwardly opening pocket) adapted to receive a roof panel. At the upper corner 250 and lower corner 255 of the groove 245, the sidewall-roof connector 210 has exterior surfaces with convex portions directly adjacent to concave portions such that the upper corner 250 and lower corner 255 are slightly deeper than other parts of the groove 245. The concave/convex portions form nooks in the corners. In an exemplary embodiment of the invention, the upper and lower corners (250, 255) are dimensioned to receive the outer skins of a roof panel.

The ends 260 of the downward protrusion 220, inward portion 230, central flange 235, and base flange 260 are shown in FIG. 5 as having a rounded curvature. However, other embodiments of the invention may use square ends, hexagonal ends, or other shapes. For example, in one embodiment, the end 260 of the inward portion 230 tapers downward such that there is a smooth transition from the upper outer skin 205 to the inward portion 230. Similarly, the corners 265 are shown as rounded corners in the illustrated example. Other embodiments of the invention may use non-rounded corners such as square corners or angled corners.

Figure 6:
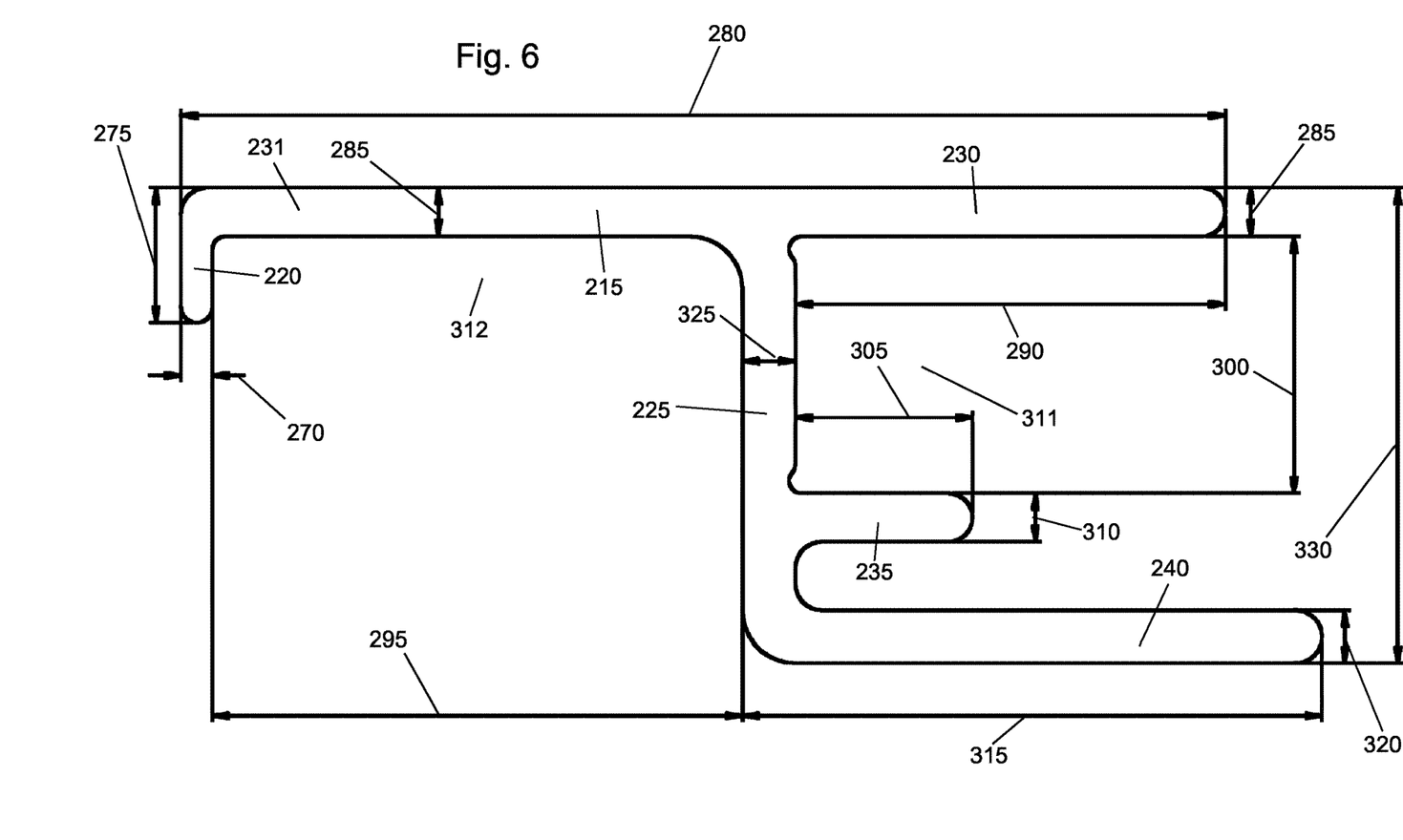
FIG. 6 shows a scale drawing of a second embodiment of a sidewall-roof connector.

FIG. 6 shows an embodiment of the sidewall-roof connector 210 that is drawn to scale. In the illustrated example, the downward protrusion 220 has a width 270 of between 0.05-0.10 inches and a height 275 in the range of 0.30-0.35 inches. The flat top 215 has a length 280 in the range of 2.4-2.6 inches and a thickness 285 in the range of 0.10-0.13 inches. The inward portion 230 of the flat top 215 has a length 290 in the range of 1.0-1.1 inches while the outward portion 231 of the flat top 215 has a length 295 in the range of 1.2-1.3 inches. The flat top 215 and the central flange 235 are separated by a distance 300 in the range of 0.60-0.65 inches while the central flange 235 has a length 305 in the range of 0.40-0.45 inches. Like the flat top 215, the central flange 235 has a thickness 310 in the range of 0.10-0.13 inches. The base flange 240 has a length 315 in the range of 1.35-1.40 inches and a thickness 320 in the range of 0.10-0.14 inches. The base flange 240 is separated from the central flange 235 by a distance (not highlighted) in the range of 0.10-0.20 inches. The central portion 225 of the sidewall-roof connector 210 has a thickness 325 in the range of 0.10-0.14 inches and a height (not shown) in the range of 1.0-1.1 inches. The sidewall-roof connector 210 has an overall height 330 in the range of 1.10-1.14 inches.

In the illustrated example, the length 315 of the base flange 240 is more than the length 295 of the outward portion 231, which is more than the length 290 of the inward portion 230 that is approximately equal to the height of the central portion 225. In the exemplary embodiment shown in FIG. 6, the length 290 of the inward portion of the top plate 215 is at least twice the length 305 length of the central flange 235. In an alternate embodiment (e.g., FIG. 7), the length of the inward portion of the top plate is approximately equal to the length of the central flange. In the embodiment shown in FIG. 6, an inwardly opening pocket 311 is formed from the central flange 235, the central portion 225, and the inward portion 230. The inwardly opening pocket 311 has a depth defined by the length 305 of a central flange and a width defined by the distance 300 of the central flange 235 from the inward portion 230. A downwardly opening pocket 312 is formed from the downward protrusion 220, the outward portion 231, and the central portion 225. The downwardly opening pocket has a depth equal to the length 275 of the downward protrusion minus the thickness 285 of the flat top 215, and a width equal to the length 295 of the outward portion 231. In the illustrated example of FIG. 6, the downwardly opening pocket 312 has a width that is at least twice the width of the inwardly opening pocket 311, and the inwardly opening pocket 311 has a depth that is at least twice that of the downwardly opening pocket 312.

The dimensions disclosed in relation to FIG. 6 are that of an exemplary embodiment and other embodiments of the invention may have different dimensions. For example, in one embodiment, the dimensions of the sidewall-roof connector are 20% larger than those disclosed in relation to FIG. 6; in another embodiment, the dimensions are 50% smaller than disclosed in FIG. 6; and in yet another embodiment, the dimensions of the sidewall-roof connector are three times larger than those disclosed in relation to FIG. 6.

Figure 7:
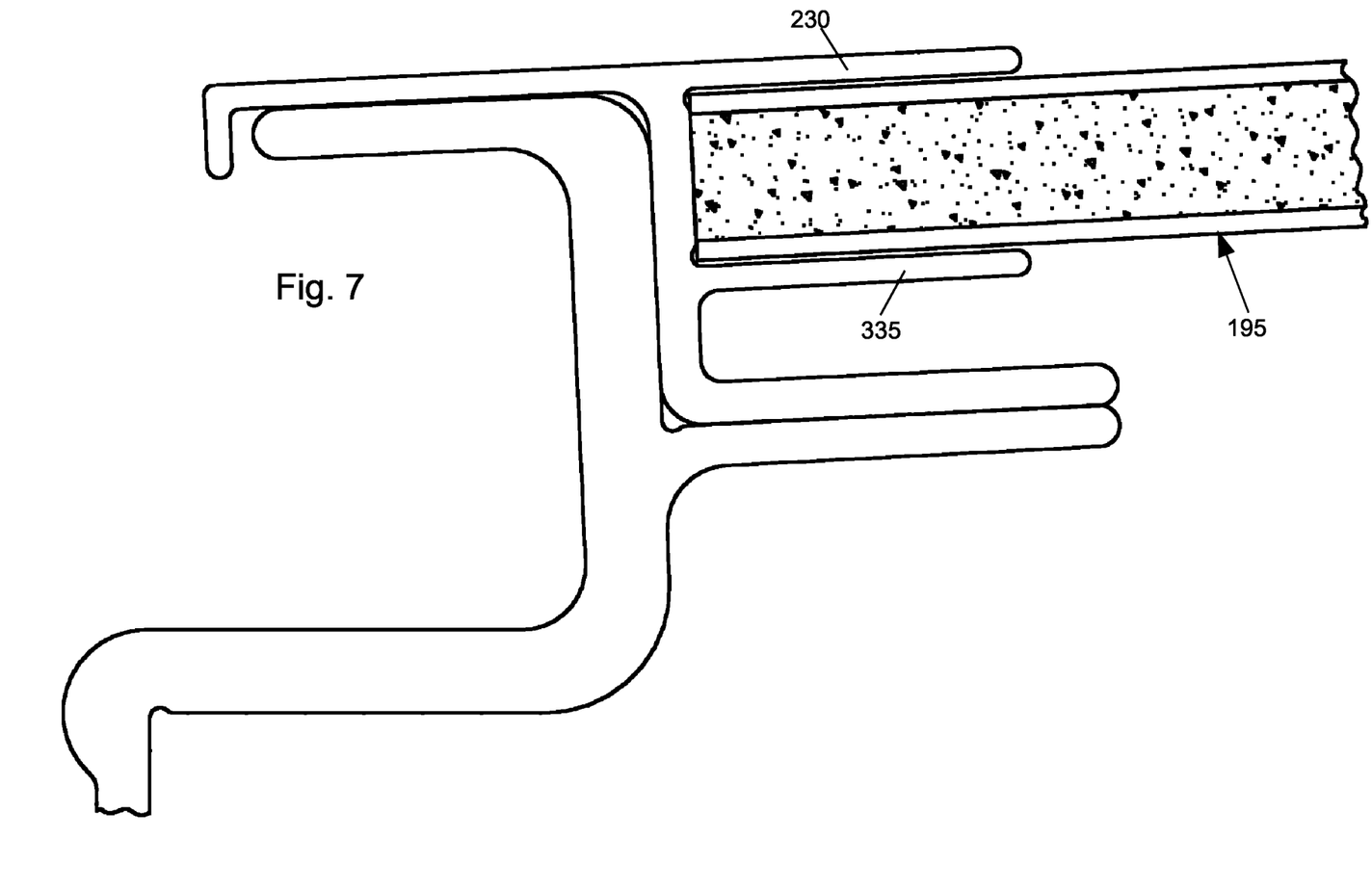
FIG. 7 shows a third embodiment of a sidewall-roof connector with an extended flange.

FIG. 7 shows an embodiment of the invention with an elongated central flange 335 that has a length approximately equal to the length of the inward portion 230. The elongated central flange 335 provides a deep pocket or groove into which the roof panel 195 is inserted.

Figure 8:
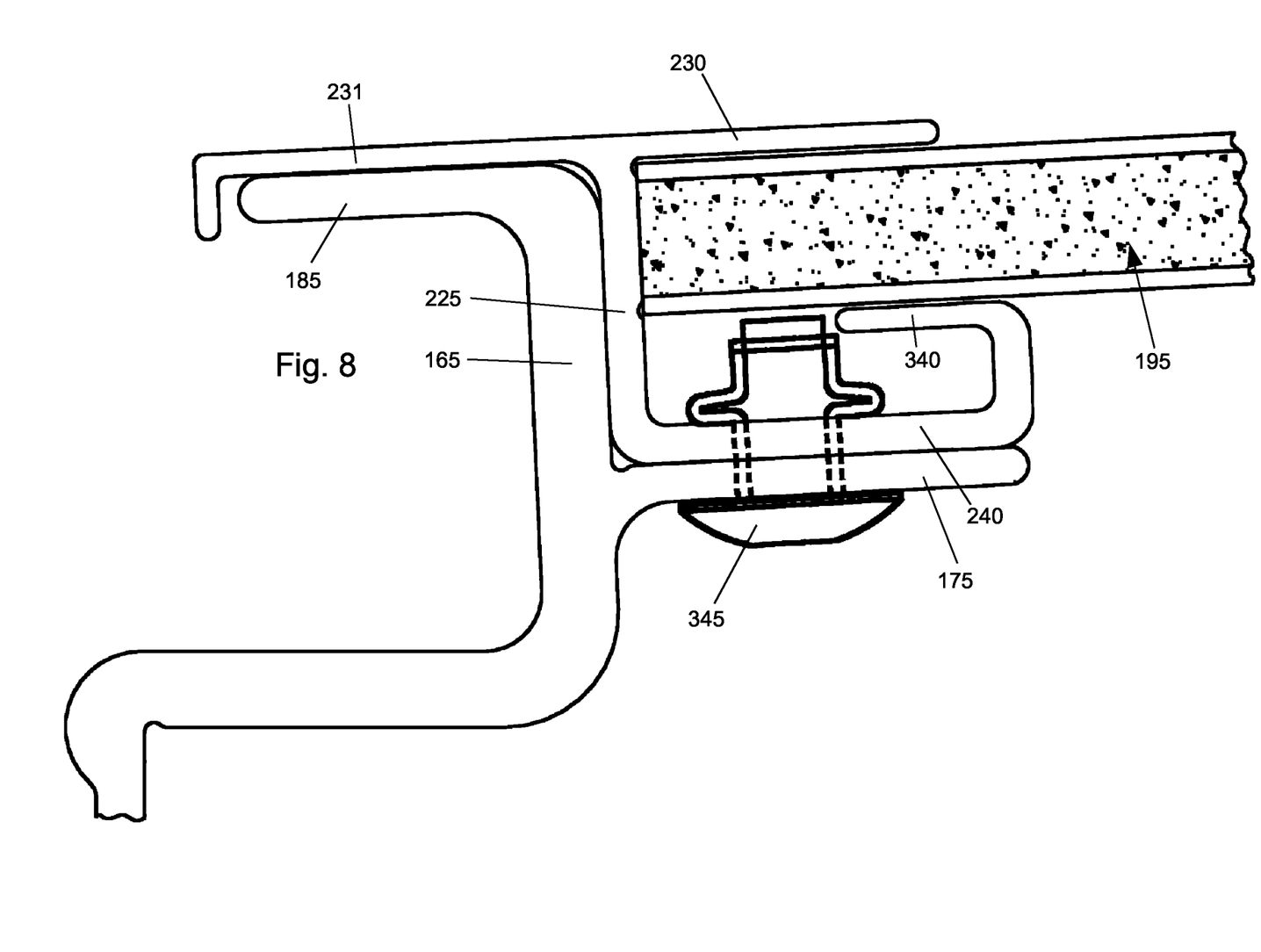
FIG. 8 shows a fourth embodiment of a sidewall-roof connector with an offset platform and rivet.

FIG. 8 shows an alternate embodiment of the invention where the central flange does not extend directly from the central portion of the sidewall-roof connector and is instead formed at the end of the base flange 240. The offset flange 340 may provide improved support for the roof panel 195 by moving the support away from the end central portion 225 of the sidewall-roof connector. Additionally, the use of an offset flange 340 may simplify container construction by not requiring the roof panel 195 and sidewall-roof connector to be as precisely aligned as some of the other embodiments when the roof panel is inserted in the connector. The space between the offset flange 340 and the central portion 225 may allow insertion of roof panels while they are slightly angled downward. FIG. 8 also shows an example of a rivet 345 securing the sidewall-roof connector to the top rail by passing through the base flange 240 and the inner flange 175 of the top rail. In the illustrated example, the rivet 345 ends below the roof panel 195, but in alternate embodiments of the invention, the rivet also extends through the roof panel 195 and the inward portion 230. In yet another embodiment of the invention, a rivet extends through the outer flange 185 of the top rail and the outward portion 231 of the connector to secure the sidewall-roof connector to the top rail. Alternatively, rivets may be passed horizontally through the central portion 225 of the sidewall-roof connector and the vertically oriented portion 165 of the top rail.

Figure 9:
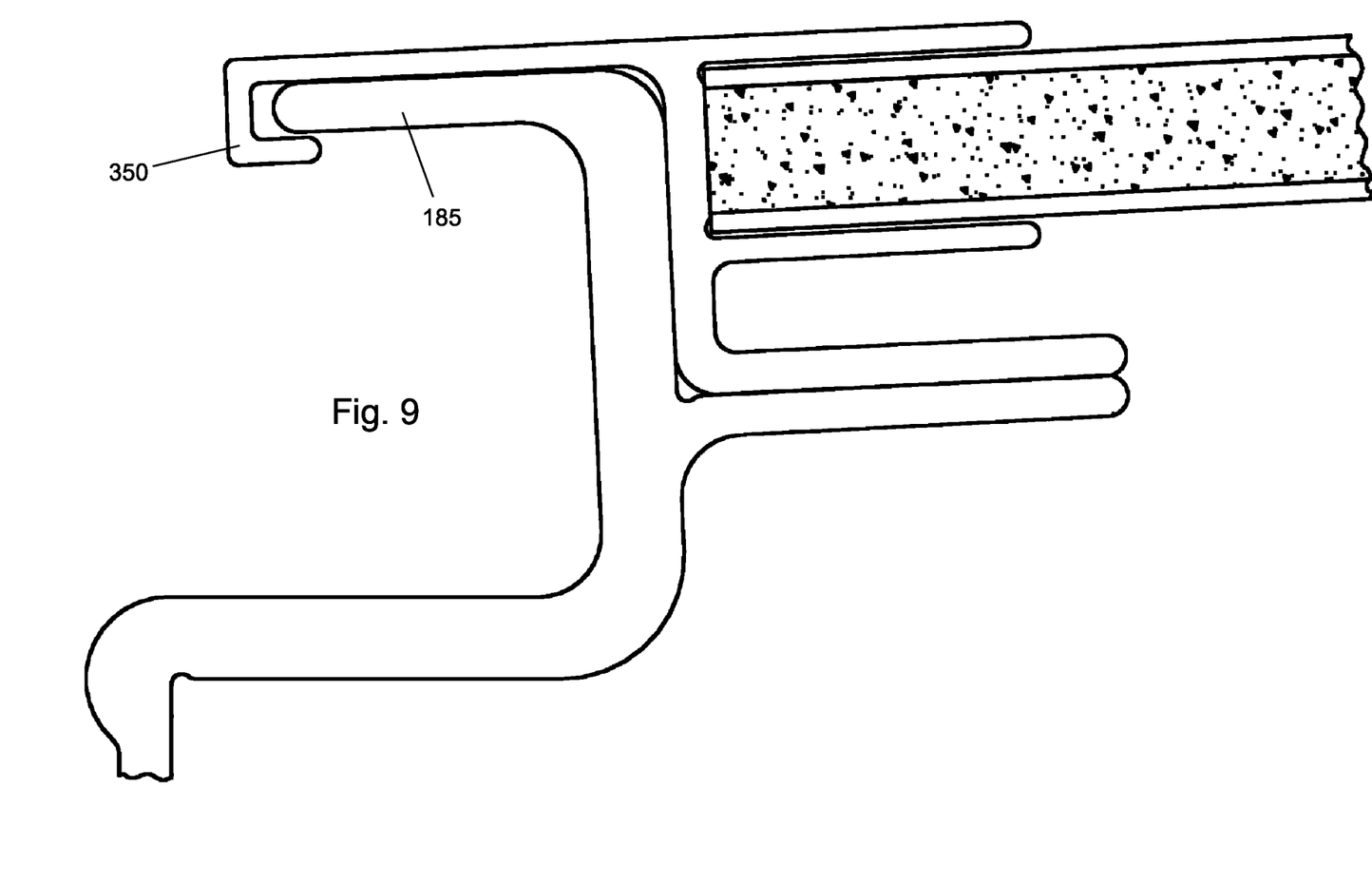
FIG. 9 shows a fifth embodiment of a sidewall-roof connector with an integrally formed sidewall locking end.

FIG. 9 shows an embodiment of a sidewall-roof connector that has a hooked downward protrusion 350 that wraps, at least in part, around the end of the outer flange 185. By hooking around the outer flange, the downward protrusion is able to not only limit inward/outward movement of the connector relative to the top rail, but also limit upward movement as well. Through the inclusion of an integrally formed hooked downward protrusion, the number of components needed to secure the sidewall-roof connector to the top rail may be reduced.

Figure 10:
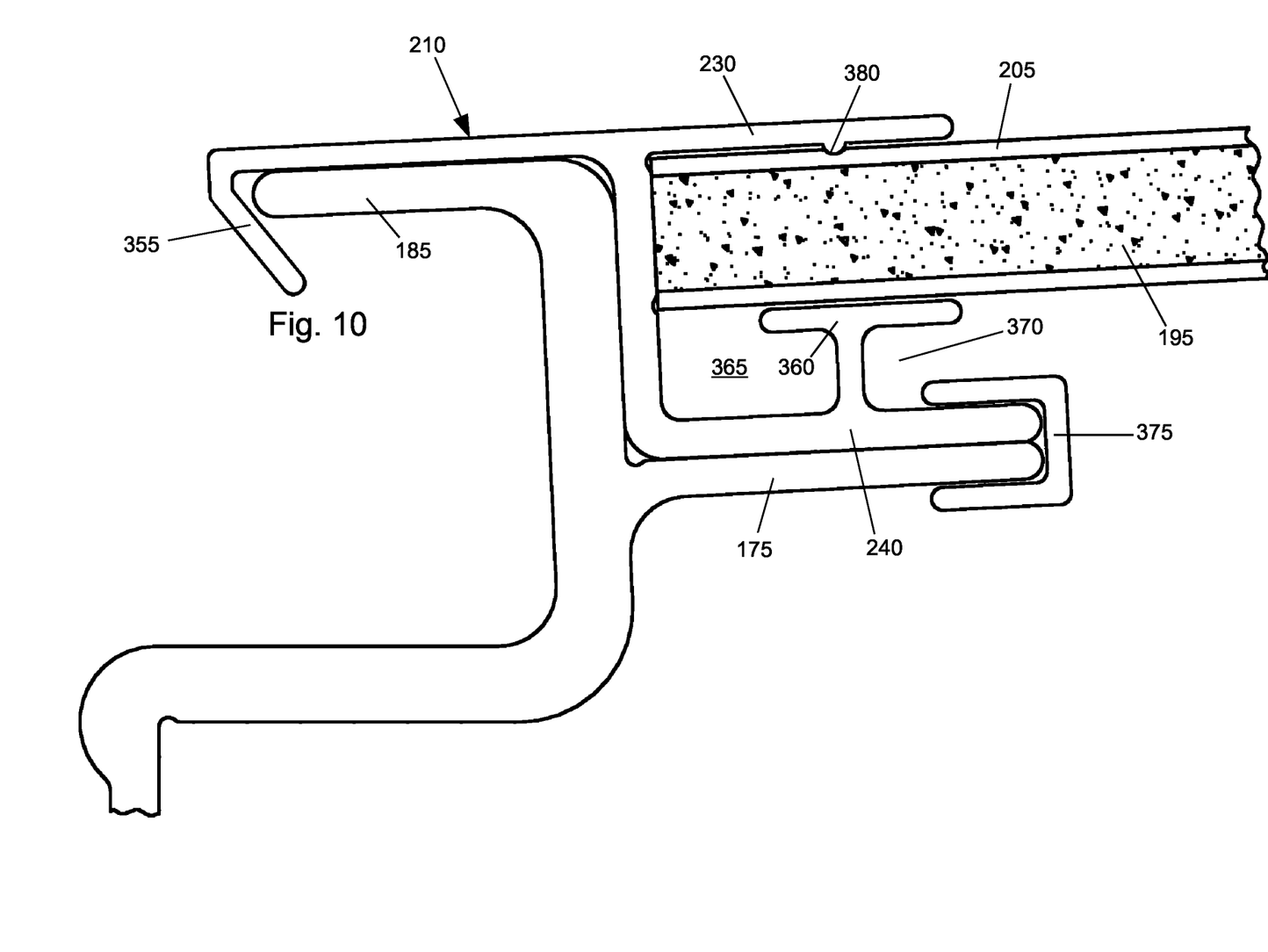
FIG. 10 shows a sixth embodiment of a sidewall-roof connector with an integrally formed sidewall locking end, a displaced roof panel support, a roof locking dimple, and a C-clamp.

FIG. 10 shows a second embodiment 355 of a hooked downward protrusion that at least partially wraps around the outer flange 185 of the top rail. In the illustrated example, the central flange of the sidewall-roof connector has been replaced with a pedestal support 360 that extends upward from the base flange 240. The pedestal support 240 defines a first pocket 365 that may be adapted to receive part of a rivet and a second pocket 370 that may be configured to receive a roof bow for the container. In the illustrated example, a clamp 375 is wrapped around the ends of the base flange 240 and the inner flange 175 to further secure the sidewall-roof connector to the top rail. Through the combination of the hooked downward protrusion 355 and the clamp 375, the sidewall-roof connector may be generally locked onto the top rail. The embodiment shown in FIG. 10 also includes a locking dimple 380 extending downward from the inward portion 230. The locking dimple 380 presses against the upper outer skin 205 of the roof panel and acts to limit inward/outward movement of the roof panel 195 relative to the sidewall-roof connector 210. While only one locking dimple is shown in the example of FIG. 10, other embodiments may utilize multiple dimples, or upward extending dimples located on the pedestal support 360. In yet another embodiment of the invention, instead of dimples, a series of outward slanting teeth (like the teeth of a ratchet mechanism) extend from the central flange and inward portion, and together act to prevent the roof panel from moving inwardly relative to the sidewall-roof connector.

Figure 11:
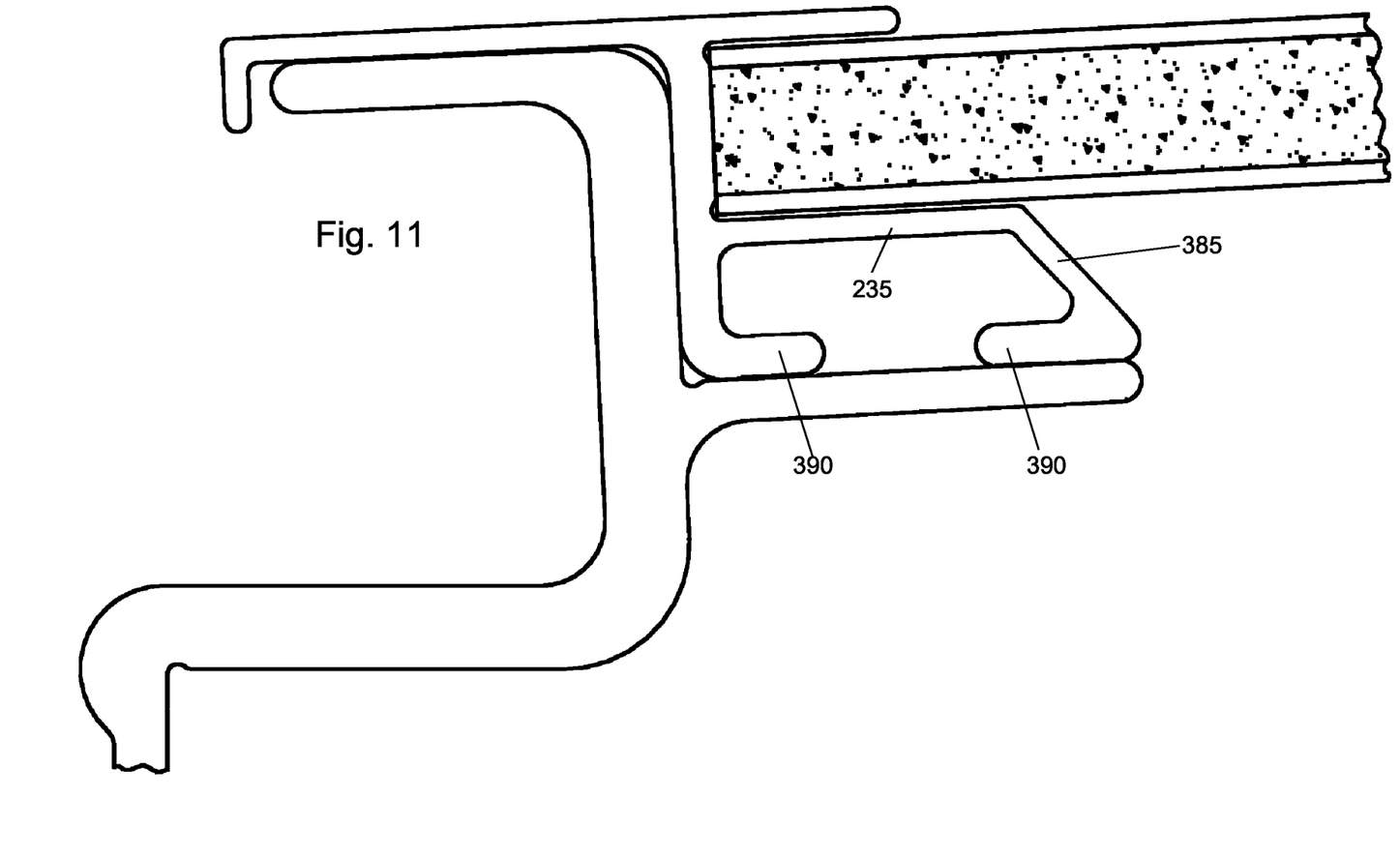
FIG. 11 shows a seventh embodiment of a sidewall-roof connector with a displaced base.

FIG. 11 shows an example of a sidewall-roof connector with a displaced support 385 for the central flange 235 and a divided base flange 390. The displaced support 385 provides additional support to the central flange 235 and improves its resiliency to downward forces upon the central flange 235.

Figure 12:
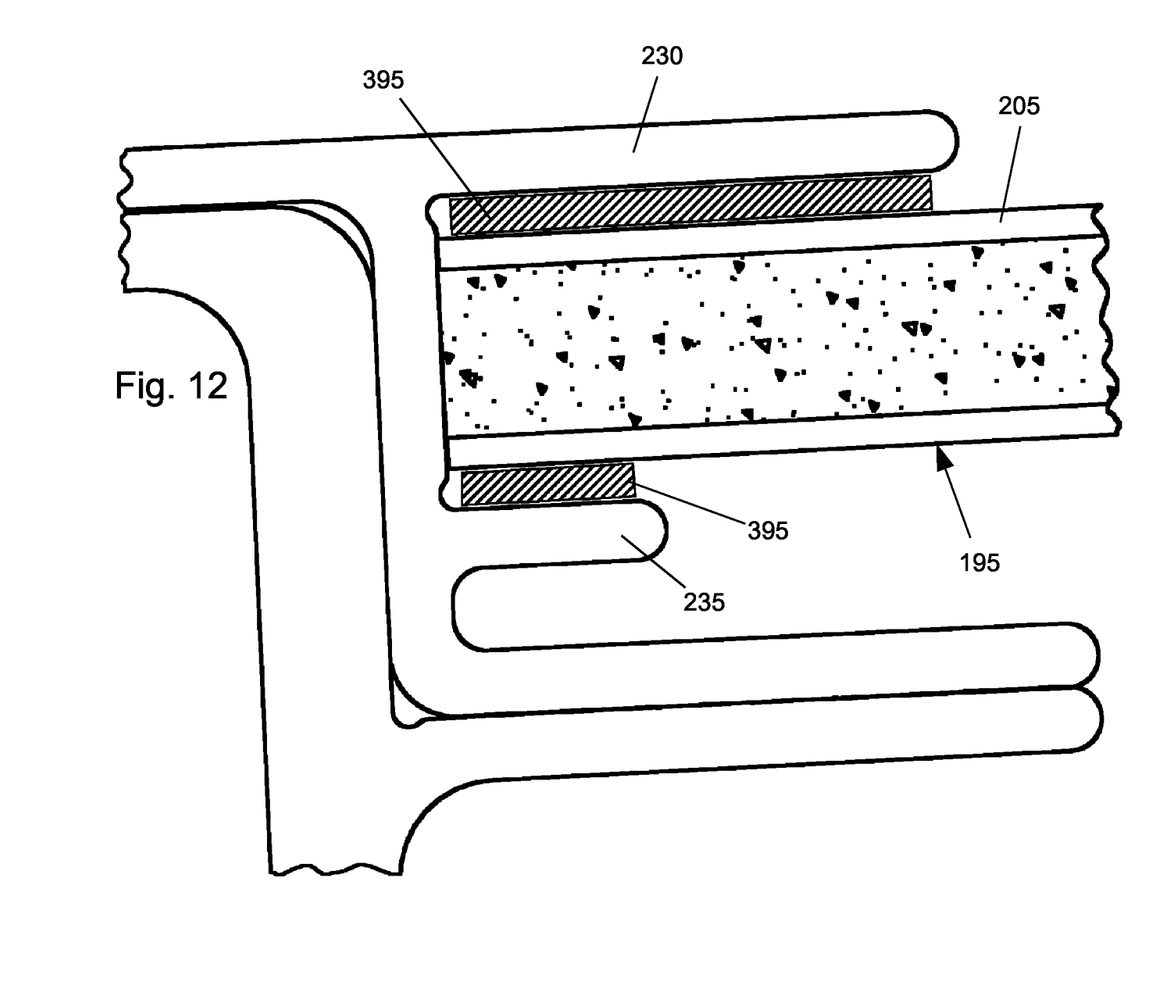
FIG. 12 shows an eighth embodiment of a sidewall-roof connector with adhesives between the connector and the composite roof panel.

FIG. 12 shows a closeup view of a sidewall-roof connector 210 with an exaggerated distance between the outer skins 205 of the roof panel 195 and the inward portion 230 and the central flange 235. Between the skins 205 and the inward portion 230/central flange 235 are bonding materials 395 that act to secure the panel to the connector and seal the connection between the panel and the connector. In one embodiment, the bonding materials 395 are double-sided adhesive tape, and in another embodiment the bonding materials 395 are caulk. In one embodiment, the bonding materials used between the upper outer skin 205 and the inward portion 230 are the same as the bonding material used between the central flange 235 and the lower outer skin 205. In another embodiment, those two bonding materials are different (e.g., one is a silicone caulk, and the other is an epoxy resin).

Figure 13:
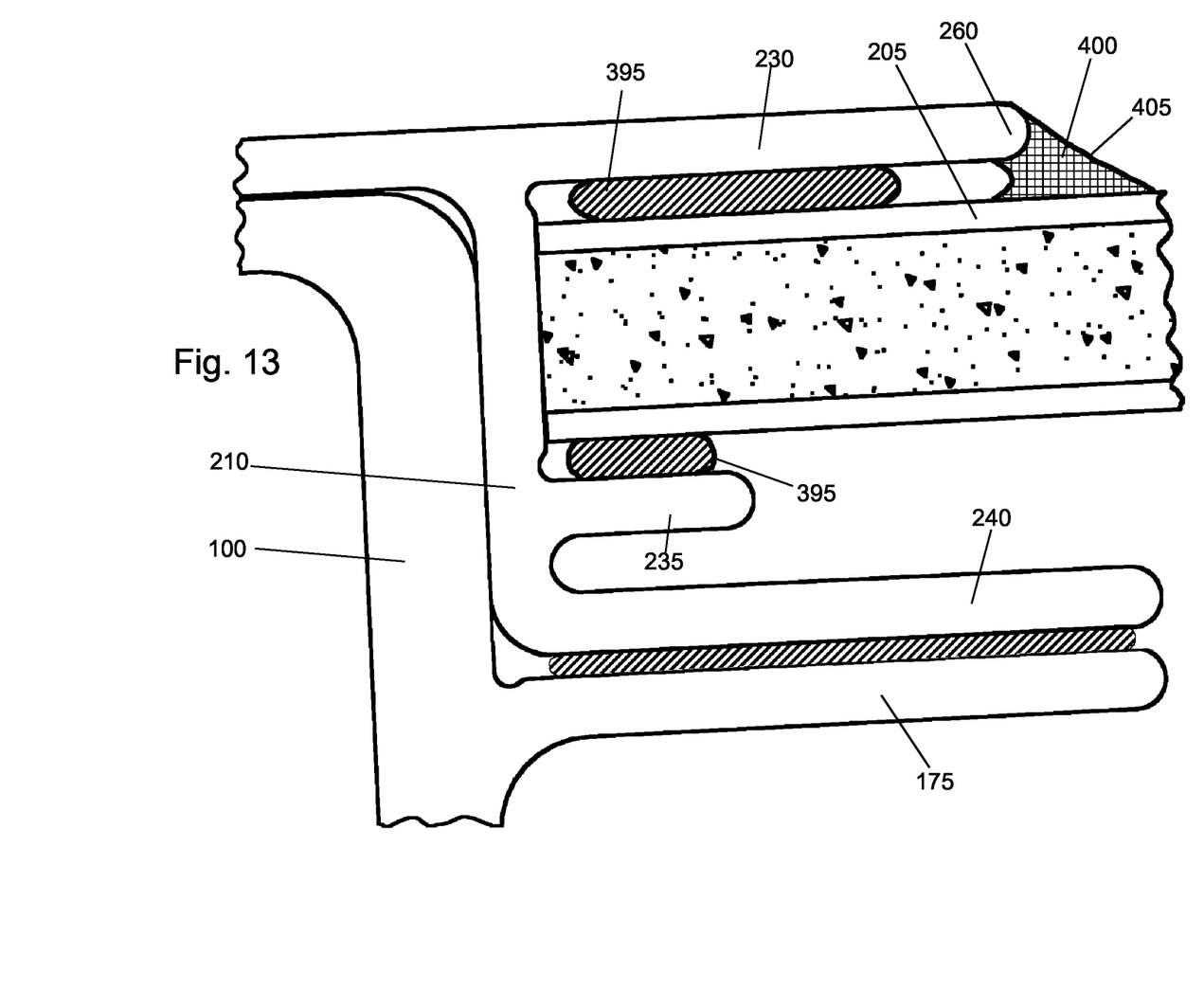
FIG. 13 shows a nineth embodiment of a sidewall-roof connector with adhesives between the connector and the roof panel, adhesives between the sidewall and connector, and a sealant.

FIG. 13 shows an alternative embodiment with bonding materials 395 between the roof panel 195 and sidewall-roof connector 210 and additional sealant 400 between the end 260 of the inward portion 230 and the upper outer skin 205. The sealant 400 acts as an additional barrier to prevent liquid intrusion into the container. Additionally, the sealant 400 has a continuous outer contour 405 that prevents objects from snagging on the end of the inward portion 230. Between the base flange 240 and the inner flange 175, bonding materials 395 such as those previously described may be used to further secure the sidewall-roof connector 210 to the top rail 130.

It should be understood that the structures, processes, methods, and systems described herein are not related or limited to any particular type components unless indicated otherwise. The specific features of the exemplary embodiments may be incorporated into other embodiments. For example, the locking dimples shown in FIG. 10, or the hooking downward protrusion shown in FIG. 9, may be incorporated into any of the embodiments described herein. Various combinations of general purpose specialized or equivalent components may be used with—or perform operations in accordance with—the teachings described herein. In view of the wide variety of embodiments to which the principles of the present invention can be applied, the illustrated embodiments are exemplary only and should not be taken as limiting the scope of the present invention. For example, more, fewer, or equivalent elements may be used in the embodiments.

I claim:

1. A connector for joining a sidewall to a roof panel, the connector comprising:
   a central wall intersecting with an upper panel;
   the upper panel having
      an inner portion located inward of the central wall, and
      an outer portion located outward of the central wall;
   a lower flange inwardly extending from the central wall below the inner portion of the upper panel;
   a central flange extending away from the central wall, the central flange located directly between the inner portion of the upper panel and the lower flange;
   wherein
   the outer portion of the upper panel, and the central wall form a downwardly opening pocket adapted to receive a portion of the sidewall; and
   the central flange, the central wall, and the inner portion of the upper panel form an inwardly opening pocket adapted to receive a portion of the roof panel.

2. The connector of claim 1 wherein
   the central flange extends directly from the central wall.

3. The connector of claim 1 wherein
   the inwardly opening pocket includes a first corner at an intersection of the central wall and the inner portion of the upper panel;
   the first corner has a concave surface directly adjacent to a convex surface; and
   the first corner is adapted to receive an outer skin of the roof panel.

4. The connector of claim 1 wherein the lower flange inwardly extends a first distance from the central wall;
   the outer portion of the upper panel outwardly extends a second distance from the central wall;
   the inner portion of the upper panel inwardly extends a third distance from the central wall;
   the third distance is less than the second distance; and
   the second distance is less than the first distance.

5. The connector of claim 1 wherein
   the downwardly opening pocket has a first depth and a first width;
   the inwardly opening pocket has a second depth and a second width;
   the second depth is at least twice the first depth; and
   the first width is at least twice the second width.

6. The connector of claim 1 wherein
the central flange inwardly extends a first distance from the central wall;
the inner portion of the upper panel inwardly extends a second distance from the central wall; and
the second distance is at least twice the first distance.

7. The connector of claim 1 wherein
the lower flange, the central wall, and the central flange form a third pocket that opens inwardly below the inwardly opening pocket; and
the third pocket is adapted to receive a roof bow to support the roof panel.

8. The connector of claim 1 further comprising
a bonding agent secured to a bottom side of the inner portion of the upper panel for securing the roof panel within the inwardly opening pocket.

9. A sidewall-roof construction of a container with an inner interior, an outer exterior, and an upper top, the sidewall-roof construction comprising:
a roof panel;
a top rail having
a vertically oriented portion,
an upper flange outwardly extending from the top of the vertically oriented portion, and
a lower flange inwardly extending from the vertically oriented portion;
a connector having
a central wall intersecting with an upper panel,
the upper panel having
an inner portion located inward of the central wall and
an outer portion located outward of the central wall, and
an under flange extending inwardly from the central wall adjacent to the lower flange of the top rail;
wherein
the outer portion of the upper panel and the central wall form a first pocket receiving the upper flange of the top rail; and
the central wall and the inner portion of the upper panel form a second pocket receiving the roof panel.

10. The sidewall-roof construction of claim 9 further comprising the connector having a
a central panel inwardly extending parallel to the inner portion of the upper panel, and
a downward flange extending from an outermost part of the outer portion of the upper panel;
wherein
the central panel partially defines the second pocket, and the downward flange partially defines the first pocket.

11. The sidewall-roof construction of claim 9 wherein
the lower flange of the top rail inwardly extends the full length of the under flange of the connector.

12. The sidewall-roof construction of claim 9 wherein
the top rail includes a horizontal top outwardly extending from the bottom of the vertically oriented portion; and
an outermost portion of the upper panel is inward of the outermost portion of the horizontal top.

13. The sidewall-roof construction of claim 9 wherein
the under flange of the connector is secured to the lower flange of the top rail via at least one of a double-sided adhesive tape, caulk, epoxy resin, and a rivet.

14. The sidewall-roof construction of claim 9 wherein
the connector is a unitary piece of metal separate from the top rail.

15. The sidewall-roof construction of claim 9 further comprising the connector having a
a central panel inwardly extending parallel to the inner portion of the upper panel;
wherein
the roof panel is a composite panel with
an upper metal skin,
a lower metal skin, and
a non-metallic inner core;
an outermost portion of the upper metal skin is directly adjacent to the inner portion of the upper panel; and
an outermost portion of the lower metal skin is directly adjacent to the central panel.

16. The sidewall-roof construction of claim 15 wherein
the second pocket has a first corner with a nook at an intersection of the central wall and the inner portion of the upper panel; and
a portion of the upper metal skin of the roof panel is located within the nook.

17. The sidewall-roof construction of claim 9 wherein
the under flange inwardly extends a first distance from the central wall;
the outer portion of the upper panel outwardly extends a second distance from the central wall;
the inner portion of the upper panel inwardly extends a third distance from the central wall;
the third distance is less than the second distance; and
the second distance is less than the first distance.

18. The sidewall-roof construction of claim 9 wherein
the first pocket has a first depth and a first width;
the second pocket has a second depth and a second width;
the second depth is at least twice the first depth; and
the first width is at least twice the second width.

19. The sidewall-roof construction of claim 9 further comprising
a bonding agent secured to both
a bottom side of the inner portion of the upper panel and
an upper metal skin of the roof panel.

20. The sidewall-roof construction of claim 9 wherein the vertically oriented portion, the upper flange, and the lower flange are formed as a unitary metal piece.

* * * * *